(No Model.) 2 Sheets—Sheet 2.
A. W. & A. H. ROOVERS.
COIN CONTROLLED STRENGTH TESTING MACHINE.
No. 434,608. Patented Aug. 19, 1890.
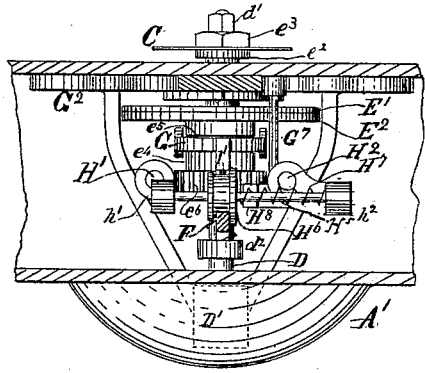
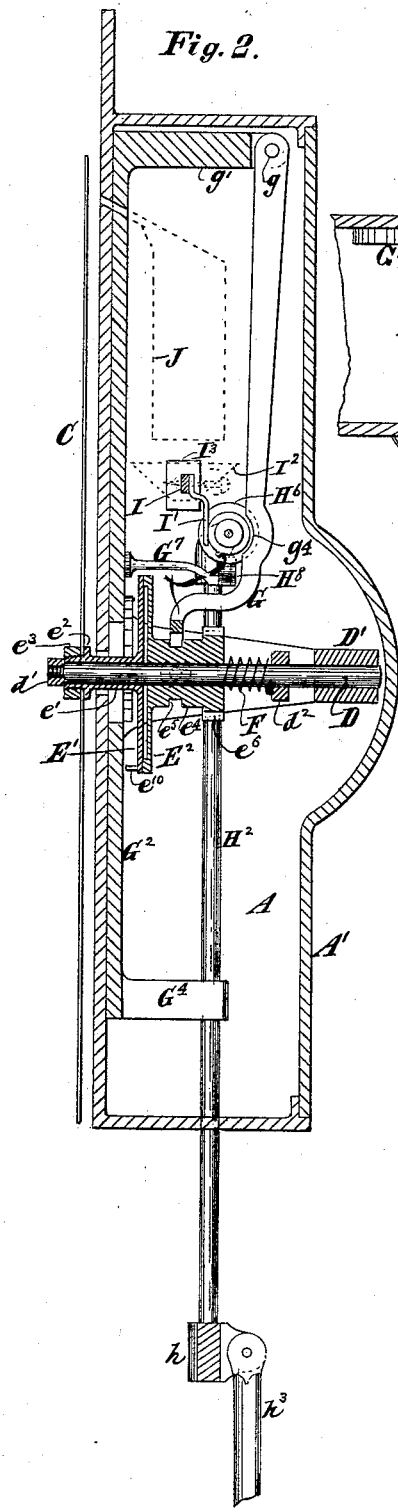
WITNESSES:
INVENTOR
THEIR ATTORNEYS

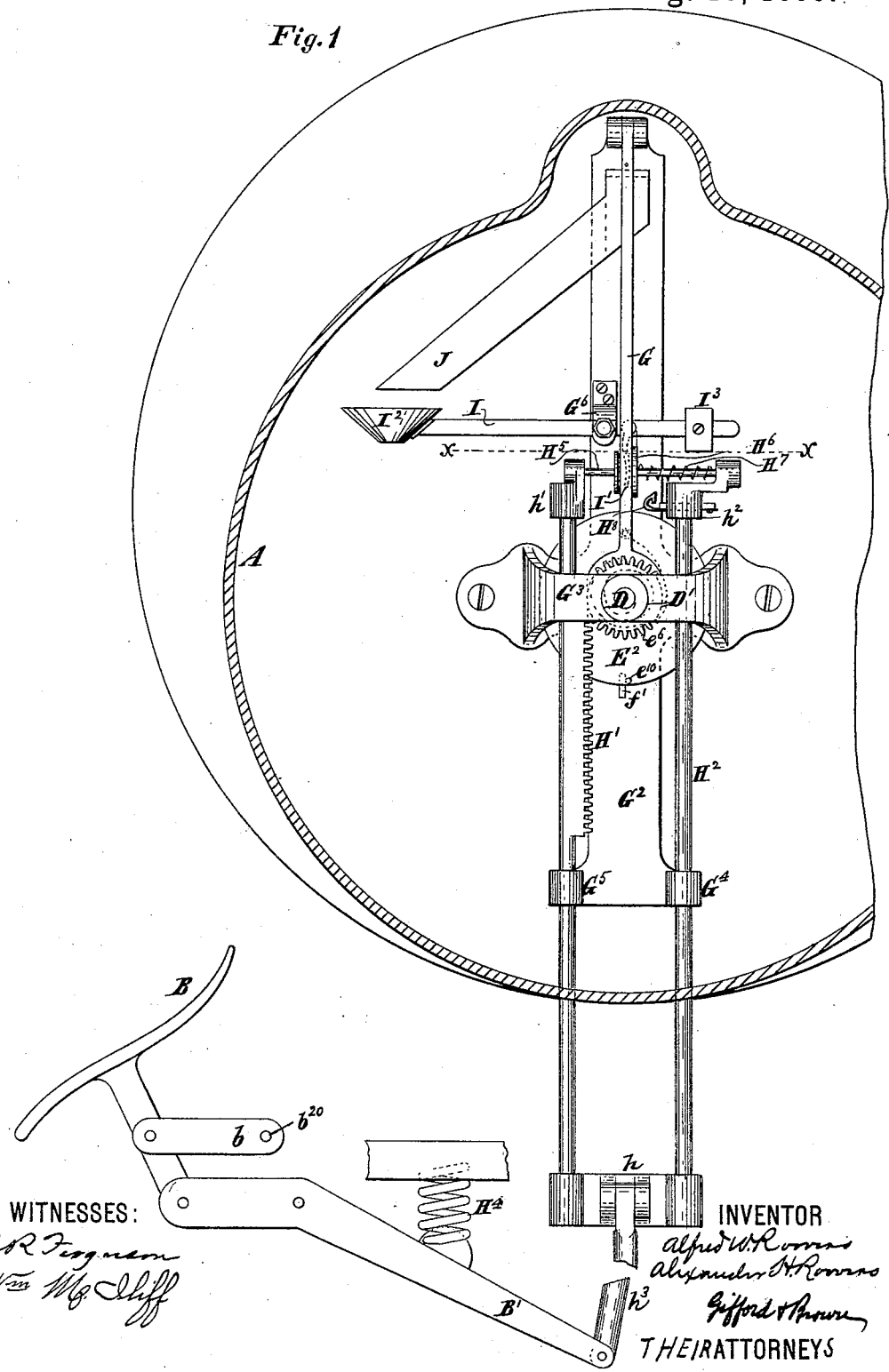

UNITED STATES PATENT OFFICE.

ALFRED W. ROOVERS AND ALEXANDER H. ROOVERS, OF BROOKLYN, NEW YORK.

COIN-CONTROLLED STRENGTH-TESTING MACHINE.

SPECIFICATION forming part of Letters Patent No. 434,608, dated August 19, 1890.

Application filed December 4, 1889. Serial No. 332,581. (No model.)

*To all whom it may concern:*

Be it known that we, ALFRED W. ROOVERS and ALEXANDER H. ROOVERS, both of Brooklyn, Kings county, and State of New York, have conjointly invented a certain new and useful Improvement in Coin - Controlled Strength-Testing Machines, of which the following is a specification.

We will describe a machine embodying our improvement, and then point out the novel features in claims.

In the accompanying drawings, Figure 1 is a back view of a machine embodying our improvement, part of the case being removed. Fig. 2 is a central vertical section of the same. Fig. 3 is a horizontal section taken at the plane of the dotted line $x\ x$, Fig. 1.

Similar letters of reference designate corresponding parts in all the figures.

In the present instance the machine is designed to test the force or strength exerted in kicking or stamping with the feet.

A designates the case of the machine. It may be made of any suitable material, preferably of cast metal, and it may be of any suitable shape. As shown it is of cylindric form with a removable back cover A'.

B designates a foot-piece, which is intended to be moved by stamping upon it or kicking against it with the foot. It is supported by having its shank pivotally connected to a swinging link $b$, hung upon a pin $b^{20}$.

C designates an index, which will indicate upon a dial formed or arranged upon the adjacent side of the case A the amount of force exerted upon the foot-piece. Our present improvement resides in certain parts of the mechanism whereby the force exerted is made to produce a movement of the index.

D designates a stud supported in a bearing D', which is formed with or secured to the case A. This stud is not intended to have any movement. On this stud are loosely mounted plates E' E². They are free to rotate independently or together around the stud. The plate E' has a tubular hub $e'$, which fits the stud, and near the outer end it is provided with a flange $e^2$, and beyond the latter is externally screw-threaded to receive a nut $e^3$. The index C is mounted upon the hub and secured between the flange $e^2$ and the nut $e^3$, so as to move with the hub, and consequently with the plate E'. The plate E' and its appurtenances are retained in place upon the stud D by providing at the outer end of the stud an externally-screw-threaded nipple, which is of smaller diameter than the body of the stud and receives a nut $d'$, which is of such size as to extend across the outer end of the hub $e'$ of the plate E'. The plate E² is provided with a hub $e^4$, which loosely surrounds the stud D. Between the rear end of this hub and a collar $d^2$, which is adjustably secured upon the stud D, a spring F surrounds the stud, forcing the hub $e^4$, and consequently the plate E², toward the plate E'. In the hub $e^4$ is a circumferential groove $e^5$, into which extends one end of a lever G, which at the other end is fulcrumed by a pin $g$ to a bracket $g'$, which is secured in the case A, it being in the present instance formed with a plate G², which is also within the case. This lever serves to move the plate E² rearwardly away from the plate E'.

The plates E' E² are intended to be of such frictional engagement that the plate E' and the index C may derive motion from the plate E². On the hub $e^4$ a pinion $e^6$ is formed or secured, and this pinion engages with a rack-bar H', extending downwardly through the lower part of the case A. Opposite the bar H' is a bar H². The bars H' H² are guided in bearings G⁴ G⁵, as also in bearings formed in a plate G³, and are at the lower ends secured to a cross-head or yoke $h$, that is connected by a rod $h^3$ with a pivoted lever B', with which the foot-piece B is connected, so that when the foot-piece is depressed the rack-bar H' will be raised and will, through the pinion $e^6$, rotate the plate E². The upward movement is opposed by a spring H⁴, here shown as arranged between the lever B' and an opposite abutment, which may be secured to any fixed part of the frame of the machine.

At the upper ends the bars H' H² are provided with heads $h'$ $h^2$, and to these is secured a stud H⁵, having loosely mounted upon it a wheel or sleeve H⁶. This wheel is movable lengthwise of the stud in one direction by a spring H⁷, that surrounds the stud between the wheel and the head $h^2$, and in the other direction by an arm I', forming part of or extending from a lever I and bearing against a flange with which the wheel is provided. The lever I is fulcrumed between its ends in a bracket or arm $G^6$, extending rearwardly from the plate $G^2$. At one end it is provided with a coin-receptacle $I^2$ and at the other with a counterbalancing-weight $I^3$, which is adjustably secured in position and serves normally to maintain the lever in a horizontal position. The coin-receptacle $I^2$ extends under a coin-chute J when the lever I is in its normal position. The coin-chute is shown as extending through the plate $G^2$ to the front of the case A.

Normally the wheel $H^6$ is in line with the lever G, and it will be seen that the latter has formed in it a notch or bend $g^4$. This is opposite the stud $H^5$ when the latter occupies its normal position; but in the operation of the machine the stud $H^5$ will be carried above the notch or bend $g^4$ of the lever.

Whenever a coin of the proper denomination is dropped into the coin-receptacle, the latter will descend and the arm $I'$ of the lever I will move the wheel $H^6$ to one side of the lever G and far enough for its flange to engage with a spring-actuated detent $H^8$, supported by a bracket or arm $G^7$, extending rearwardly from the plate $G^2$. It will be held in this position by the detent until carried upwardly beyond the reach of the detent. If while the wheel thus occupies a position to one side of the lever G the foot-piece be depressed, the wheel $H^6$ will be carried upwardly by the bars $H'\,H^2$ without affecting the lever G, and the plate $E^2$ will therefore remain in frictional engagement with the plate $E'$. The plate $E'$ is provided with a pin $e^{10}$, which is intended to coact or contact with a pin $f'$, that is affixed to the plate $G^2$, to stop the index opposite the zero-point on the dial; hence during the rotation produced by the upward movement of the bars $H'\,H^2$ the plate $E'$ will not rotate, except far enough to bring the index to the zero point. When the bars $H'\,H^2$ are lowered by the spring $H^4$, the plate $E^2$ will be rotated in the reverse direction, and will then carry with it the plate $E'$ and impart motion to the index C. As the downward movement of the bars $H'\,H^2$ will correspond to the upward movement, the index will be moved to properly indicate the force exerted upon the foot-piece. When the index is thus moved, it will remain so moved until the machine is used again. The upward movement of the stud $H^5$ carries the wheel $H^6$ beyond the detent $H^8$; but by the time it has been carried far enough for disengagement from the detent it will be above the notch or bend $g^4$ of the lever G, and hence the lever will prevent it from being moved by the spring $H^7$ to its normal position in line with said lever. When the bars $H'\,H^2$ are lowered so as to bring the wheel back to its normal horizontal position, it will slip past the notch or bend $g^4$ of the lever and move sidewise into a position in front of the lever.

Should any attempt be made to operate the machine without putting in a coin of the proper denomination, the bars $H'\,H^2$ will be moved upward; but as the wheel $H^6$ will not be moved laterally out of line with the lever G the wheel after being moved above the notch or bend $g^4$ of said lever will vibrate the lever backward, and thereby separate the plate $E^2$ from the plate $E'$ and prevent the latter from receiving any rotary motion.

The wheel $H^6$ may be free to turn upon the stud $H^5$ or may have merely motion in the direction of the length of the latter.

Obviously the spring $H^7$, acting through the wheel $H^6$ and arm $I'$ of the lever I, opposes the downward movement of that end of the lever I which is provided with the coin-receptacle, and hence the weight $I^3$ will not need to be so heavy as otherwise it would be, and, indeed, may even be dispensed with, as the spring may be made to serve as a counter-balance to the coin-receptacle.

The plates $E'\,E^2$ are practically friction-wheels.

Instead of the stud D, a shaft might obviously be used; hence the stud may be regarded as a stud or shaft.

What we claim as our invention, and desire to secure by Letters Patent, is—

1. In a strength-testing machine, the combination of a plate or friction-wheel, a stud or shaft around the axis of which the said plate or friction-wheel may rotate and along which it may be moved, a bar moving longitudinally to rotate said plate or friction-wheel, a lever serving to move said plate or friction-wheel lengthwise of the stud or shaft and having a notch or bend, a wheel or sleeve mounted upon a stud carried by said bar, a coin-receptacle serving to move said wheel or sleeve laterally to one side of said lever, and a second plate or friction-wheel carrying an index, substantially as specified.

2. In a strength-testing machine, the combination of a plate or friction-wheel, a stud or shaft around the axis of which the said plate or friction-wheel may be rotated and along which it may be moved, a bar moving longitudinally to rotate said plate or friction-wheel, a lever serving to move said plate or friction-wheel lengthwise of the stud or shaft in one direction, a spring for moving it in the reverse direction, a wheel or sleeve mounted upon a stud carried by said bar, a coin-receptacle serving to move said wheel or sleeve laterally to one side of said lever, and a second plate or friction-wheel carrying an index, substantially as specified.

3. In a strength-testing machine, the combination of a plate or friction-wheel, a stud or shaft around the axis of which the said plate or friction-wheel may rotate and along which it may be moved, a bar moving longitudinally to rotate said plate or friction-wheel, a lever serving to move said plate or friction-wheel lengthwise of the stud or shaft and having a notch or bend, a wheel or sleeve mounted upon a stud carried by said bar, a detent for engaging said wheel or sleeve when moved laterally to one side of said lever, a coin-receptacle serving to move said wheel or sleeve laterally to one side of said lever, and a second plate or friction-wheel carrying an index, substantially as specified.

4. In a strength-testing machine, the combination of a plate or friction-wheel, a stud or shaft around the axis of which the said plate or friction-wheel may rotate and along which it may be moved, a bar moving longitudinally to rotate said plate or friction-wheel, a lever serving to move said plate or friction-wheel lengthwise of the stud or shaft and having a notch or bend, a wheel or sleeve mounted upon a stud carried by said bar, a lever for moving the wheel or sleeve lengthwise of the stud or shaft in one direction, a coin-receptacle affixed to said lever, and a second plate or friction-wheel carrying an index, substantially as specified.

5. In a strength-testing machine, the combination of a plate or friction-wheel, a stud or shaft around the axis of which the said plate or friction-wheel may rotate and along which it may be moved, a bar moving longitudinally to rotate said plate or friction-wheel, a lever serving to move said plate or friction-wheel lengthwise of the stud or shaft and having a notch or bend, a wheel or sleeve mounted upon a stud carried by said bar, a lever for moving the wheel or sleeve lengthwise of the stud or shaft in one direction, a spring for moving it in the other direction, a coin-receptacle affixed to said lever, and a second plate or friction-wheel carrying an index, substantially as specified.

6. In a strength-testing machine, the combination of a plate or friction-wheel, a stud or shaft around the axis of which the said plate or friction-wheel may rotate and along which it may be moved, a bar moving longitudinally to rotate said plate or friction-wheel, a lever serving to move said plate or friction-wheel lengthwise of the stud or shaft and having a notch or bend, a wheel or sleeve mounted upon a stud carried by said bar, a coin-receptacle serving to move said wheel or sleeve laterally to one side of said lever, a second plate or friction-wheel carrying an index, and a stop on a stationary part of the machine precluding the movement of the index past the zero-mark of the dial, substantially as specified.

ALFRED W. ROOVERS.
ALEXANDER H. ROOVERS.

Witnesses:
EDWIN H. BROWN,
S. O. EDMONDS.